UNITED STATES PATENT OFFICE.

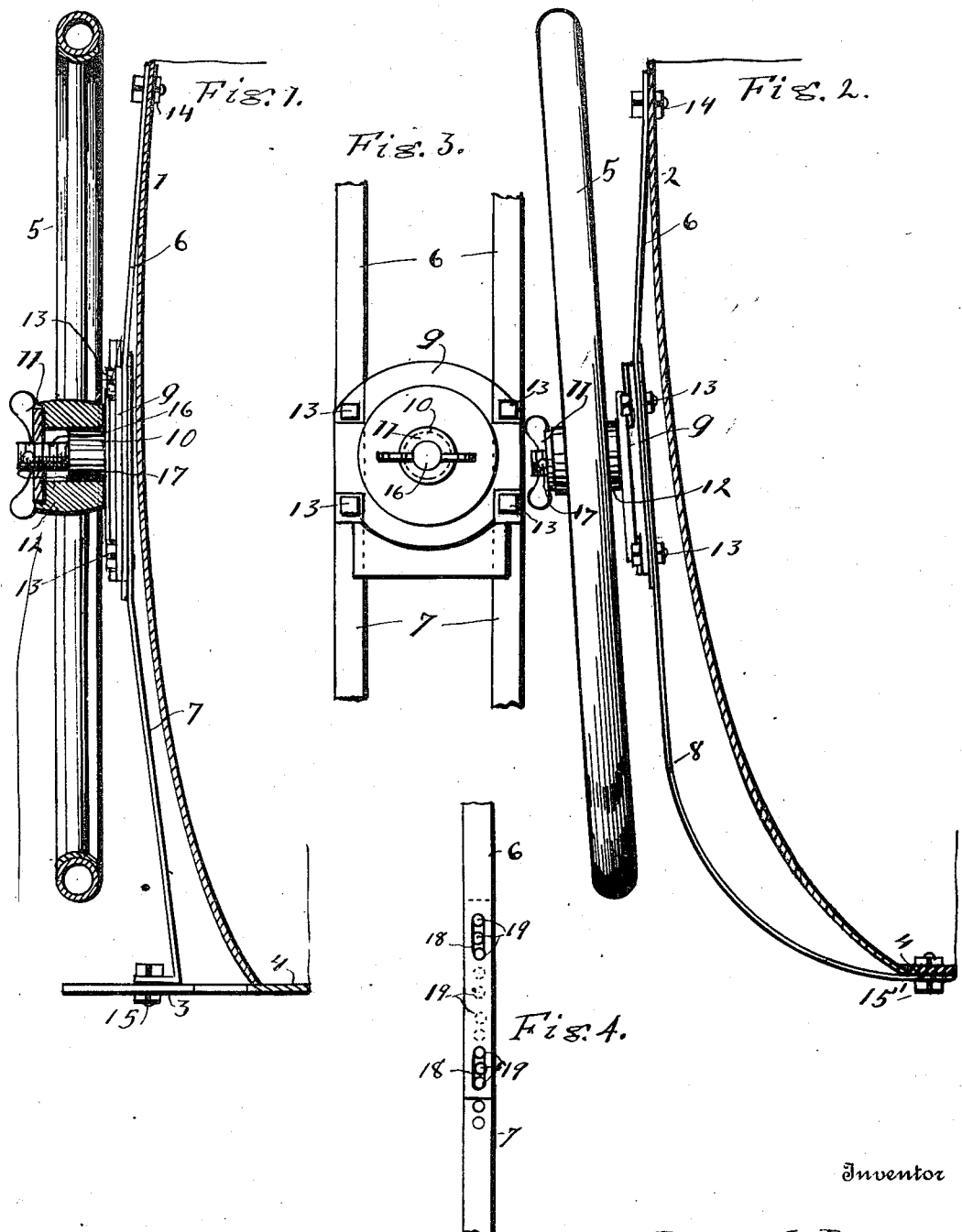

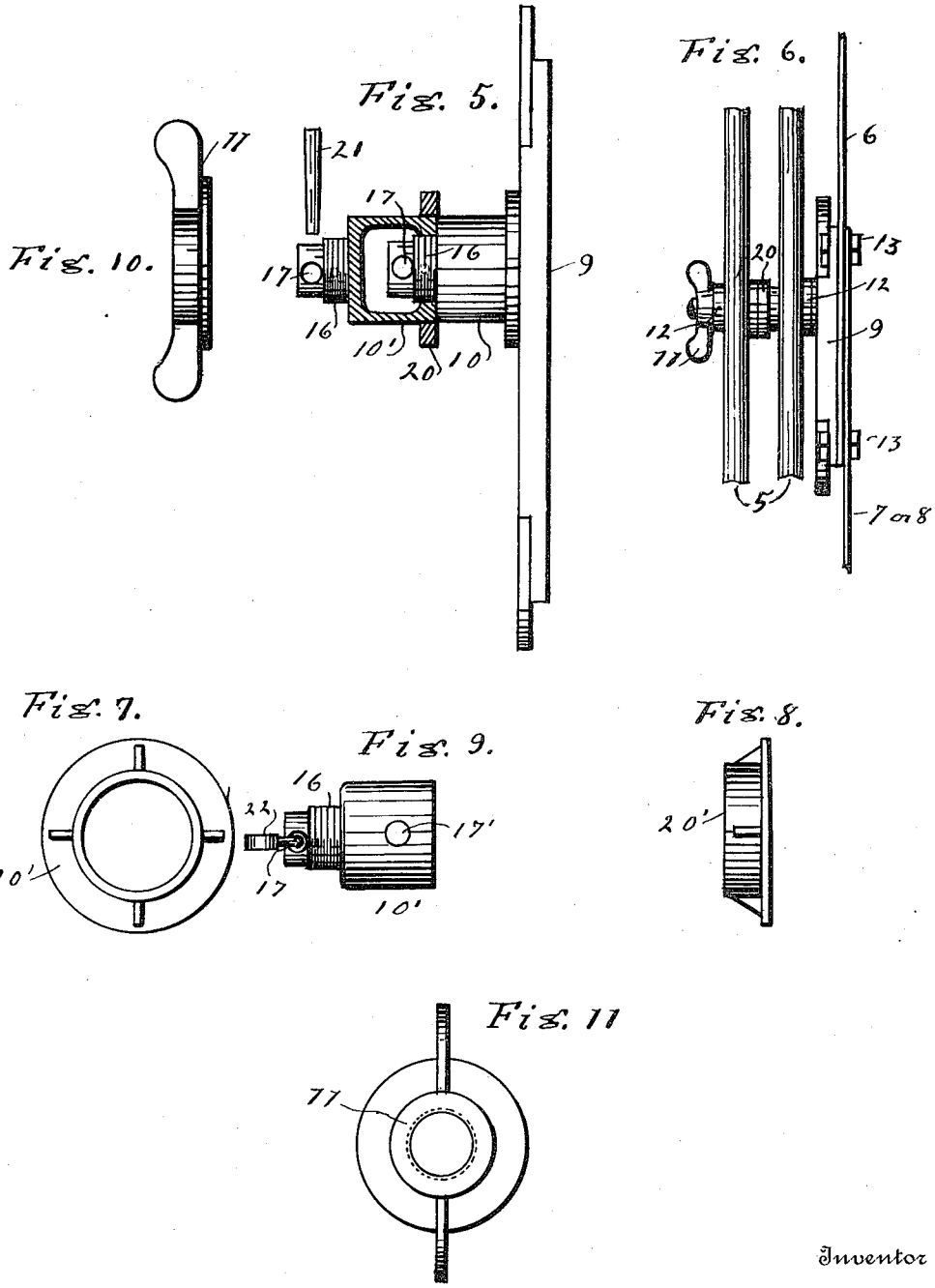

RUSSELL A. BATES, OF GRAND RAPIDS, MICHIGAN, ASSIGNOR TO L. D. TAYLOR, OF GRAND RAPIDS, MICHIGAN.

WHEEL-BRACKET.

1,301,028.   Specification of Letters Patent.   Patented Apr. 15, 1919.

Application filed January 12, 1917. Serial No. 141,950.

*To all whom it may concern:*

Be it known that I, RUSSELL A. BATES, a citizen of the United States, residing at Grand Rapids, in the county of Kent and State of Michigan, have invented certain new and useful Improvements in Wheel-Brackets, of which the following is a specification.

My invention relates to improvements in brackets for supporting and carrying extra automobile wheels on an automobile, and its objects are: first, to provide a wheel bracket that may be readily adjusted to accommodate itself to any make of automobiles; second, to provide a bracket that may be applied either to the side, or to the back of an automobile body, as desired; third, to provide a wheel bracket to which the wheel may be attached or from which it may be removed with a minimum of exertion on the part of the operator; fourth, to provide an automobile bracket that may be readily adjusted to carry one or two wheels.

I attain these objects by the mechanism illustrated in the accompanying drawing, in which Figure 1 is an edge elevation of a bracket as attached to the side of an automobile. Fig. 2 is a like view attached at the back of the automobile body. Fig. 3 is a front elevation of the bracket with the supporting braces broken off. Fig. 4 is a plan of the adjacent ends of the arms that support the bracket. Fig. 5 is an edge elevation of the bracket with an extension hub shown in section. Fig. 6 is the same with parts of two wheels in place. Fig. 7 is an end elevation, and Fig. 8 is a side elevation of the dividing washer that is used to hold two wheels apart when mounted on one bracket. Fig. 9 shows the extension hub in elevation. Figs. 10 and 11 are an edge elevation, and a front elevation, respectively, of the nut that is used to secure the wheels onto the bracket.

Similar numerals refer to similar parts throughout the several views.

The bracket, 9, is made of cast iron, or other suitable material, and has a lug or bearing 10 made integral with, or securely attached to the bracket, and designed to pass through the hub of the wheel as indicated in Figs. 1 and 2. This bracket is mounted upon spring steel supports, 6 and 7, or 6 and 8, as the case may be. When applying the bracket to the side of an automobile body the upper ends of the supports 6, 6 are securely bolted to the upper edge of the automobile body, as at 14, and the lower ends of the supports 7, 7 are secured in a like manner to the running board 3, as at 15, in such a manner that the supports will not chafe or injure the sides of the automobile body. When applying the bracket to the back of an automobile body I make use of a modified form of support for the lower end, as indicated at 8, the support 6 being secured near the upper edge of the body, as at 14, and the support 8 being secured to the bottom 4, of the body, as at 15'. The meeting ends of the sections 6 and 7, or 6 and 8, as the care may be, are lapped by each other and are securely connected by means of the bolts 13, 13, that secure the bracket 9 to the supports, and the meeting ends of the supports are so constructed that, when the bolts 13, 13 are loosened the ends may be slid along each other to lengthen or shorten the support. One available construction for this purpose is shown in Fig. 4. In this construction the section 6 is provided with slots 18, and is placed between the section 7, or 8, and the back surface of the bracket so that when the bolts 13, 13 are passed through the holes in the bracket, the slots 18, and the holes 19 in the two sections of the support, and the bolts properly drawn into place the sections 6 and 7, or 8, will be so firmly held in place that no movement is possible between them. The object of making this connection in this manner is to provide for adjusting the length of the supports to correspond with the height of the body to which they are to be applied.

The wheel 5 is placed onto the lug 10 and secured in place by screwing the nut 11 onto the threaded bearing 16. To avert the danger of the nut 11 becoming loose on its bearing, a pin, as 21, may be passed through the hole 17 in the end 16 of the lug 10, or 10', and thus the danger of the wheels becoming loose on the lugs will be wholly eliminated.

I provide for carrying more than one wheel on the one bracket by means of an extension 10' that may be screwed onto the threaded projection 16 of the lug 10, as indicated in Fig. 5, and may be firmly secured in place by passing the pin 21 through the opening 17' in the extension 10' and the opening 17 in the projecting bearing 16. When using the extension two wheels may be mounted on the same bracket, as shown in Fig. 6, but when so mounting them some provision must be made to prevent the adjacent ends of the wheel hubs 12 rubbing upon, and chafing each other, and for this purpose I provide a washer, as 20, in Figs. 5 and 6. This washer may be a plain washer, as shown in said Figs. 5 and 6, or it may be made of any desired form. I prefer the form shown at 20' in Figs. 7 and 8 as they may be made much lighter, and are much more readily applied and conveniently handled, and are more sightly than the form shown at 20.

With this construction, the wheels may be readily made to revolve on the lugs, if desired, and may be readily removed from, or replaced upon the lugs of the bracket by simply adjusting the retaining nut, 11.

To avert the danger of the extra wheels being stolen when the automobile is alone upon a highway, or in an open garage, a pad lock may be used in the outer hole 17 in the lug 10 or 10', as the case may be, as indicated at 22 on Fig. 9.

What I claim as new, and desire to secure by Letters Patent of the United States is:—

1. In a bracket for storing extra wheels on the body of an automobile, a pair of longitudinally adjustable spring arms each made in two pieces longitudinally and secured at one end of each arm to the upper portion of the automobile body, and at the other end of each arm near the lower part of the automobile body, a bracket adjustably secured to and connecting said arms near their longitudinal centers, a lug extending outwardly from the surface of the bracket and adapted to be passed through the hole in the hub of the wheel, and means for securing the wheel onto said lug.

2. In a bracket for securing extra wheels to the body of an automobile, supporting arms secured to the automobile body near the top and bottom thereof, a bracket secured to the said arms near their longitudinal centers, a supporting lug extending from the surface of the bracket, a screw threaded end projecting from the end of the lug and having a laterally disposed hole through it, an extension made to engage the screw threaded end of the lug, and having a laterally disposed hole corresponding with the hole in the screw threaded end of the supporting lug, a pin engaging said holes, a screw threaded end on the extension having a laterally disposed hole through it, a nut made to engage the screw threaded end on the extension, and a pin passed through the hole in the end of the extension.

3. In a bracket for carrying extra wheels on automobiles, extensible parallel supporting arms secured at one end of each arm to the automobile body near its upper edge, and the other end of each arm secured near the bottom of the automobile body, a supporting plate secured to the arms near their longitudinal center, a lug projecting from the outer surface of said plate, a screw threaded end projecting from the end of the lug, an extension lug fitted to engage the screw threaded end of the main lug, and having a screw threaded projection at the outer end, a nut fitted to engage said screw threaded projection, means for preventing the extension and the nut from becoming disconnected from their screw threaded supports, and a collar fitted to pass over the extension and the first named lug.

Signed at Grand Rapids, Michigan, January 6, 1917.

RUSSELL A. BATES.